United States Patent
Azarian Yazdi et al.

(10) Patent No.: US 11,704,571 B2
(45) Date of Patent: Jul. 18, 2023

(54) LEARNED THRESHOLD PRUNING FOR DEEP NEURAL NETWORKS

(71) Applicant: QUALCOMM Incorporated, San Diego, CA (US)

(72) Inventors: Kambiz Azarian Yazdi, San Diego, CA (US); Tijmen Pieter Frederik Blankevoort, Amsterdam (NL); Jin Won Lee, San Diego, CA (US); Yash Sanjay Bhalgat, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 245 days.

(21) Appl. No.: 17/067,233

(22) Filed: Oct. 9, 2020

(65) Prior Publication Data
US 2021/0110268 A1  Apr. 15, 2021

Related U.S. Application Data

(60) Provisional application No. 62/914,233, filed on Oct. 11, 2019.

(51) Int. Cl.
*G06N 3/08* (2023.01)
*G06N 3/082* (2023.01)
*G06N 3/04* (2023.01)

(52) U.S. Cl.
CPC .............. *G06N 3/082* (2013.01); *G06N 3/04* (2013.01)

(58) Field of Classification Search
CPC ................................. G06N 3/082; G06N 3/04

USPC ......................................................... 706/25
See application file for complete search history.

(56) References Cited

U.S. PATENT DOCUMENTS

| | | | |
|---|---|---|---|
| 2019/0180184 A1* | 6/2019 | Deng | G06N 3/084 |
| 2019/0340493 A1* | 11/2019 | Coenen | G06N 3/04 |
| 2020/0293893 A1* | 9/2020 | Georgiadis | G06N 3/063 |
| 2021/0158166 A1 | 5/2021 | Azarian Yazdi et al. | |
| 2022/0091837 A1* | 3/2022 | Chai | G06F 8/36 |

OTHER PUBLICATIONS

Chandakkar P.S., et al., "Strategies for Re-Training a Pruned Neural Network in an Edge Computing Paradigm", 2017 IEEE International Conference on Edge Computing (Edge), IEEE, Jun. 25, 2017 (Jun. 25, 2017), pp. 244-247, XP033151610, DOI: 10.1109/IEEE.EDGE.2017.45 [retrieved on Sep. 7, 2017] the whole document.
International Search Report and Written Opinion—PCT/US2020/055167—ISA/EPO—dated Feb. 22, 2021.

(Continued)

*Primary Examiner* — Omar F Fernandez Rivas
*Assistant Examiner* — Tri T Nguyen
(74) *Attorney, Agent, or Firm* — Seyfarth Shaw LLP (57) ABSTRACT

A method for pruning weights of an artificial neural network based on a learned threshold includes determining a pruning threshold for pruning a first set of pre-trained weights of multiple pre-trained weights based on a function of a classification loss and a regularization loss. Weights are pruned from the first set of pre-trained weights when a first value of the weight is less than the pruning threshold. A second set of pre-trained weights of the multiple pre-trained weights is fine-tuned or adjusted in response to a second value of each pre-trained weight in the second set of pre-trained weights being greater than the pruning threshold.

28 Claims, 6 Drawing Sheets

(56) References Cited

OTHER PUBLICATIONS

Manessi F., et al., "Automated Pruning for Deep Neural Network Compression," arxiv.org, Cornell University Library, 201 OLIN Library Cornell University Ithaca, NY 14853, Dec. 5, 2017 (Dec. 5, 2017), XP080844910, abstract sections 3, 4, 8 pages.
Ramakrishnan R.K, et al., "Differentiable Mask for Pruning Convolutional and Recurrent Networks,"arxiv.org, Cornell University Library, 201 OLIN Library Cornell University Ithaca, NY 14853, Sep. 10, 2019 (Sep. 10, 2019), XP081651316, sections 1. 3, 9 pages.
Azarian K., et al., "Learned Threshold Pruning", arxiv.org, Cornell University Library, 201 Olin Library Cornell University Ithaca, NY14853, Feb. 28, 2020 (Feb. 28, 2020).

\* cited by examiner

LEARNED THRESHOLD PRUNING FOR DEEP NEURAL NETWORKS

CROSS-REFERENCE TO RELATED APPLICATION

The present application claims the benefit of U.S. Provisional Patent Application No. 62/914,233, filed on Oct. 11, 2019, and titled "LEARNED THRESHOLD PRUNING FOR DEEP NEURAL NETWORKS," the disclosure of which is expressly incorporated by reference in its entirety.

BACKGROUND

Field

Aspects of the present disclosure generally relate to pruning deep neural networks.

Background

Convolutional neural networks use many computational and storage resources. As such, it may be difficult to deploy conventional neural networks on systems with limited resources, such as cloud systems or embedded systems. Some conventional neural networks are pruned and quantized to reduce processor and memory use. It is desirable to improve pruning methods to improve system performance.

SUMMARY

In an aspect of the present disclosure, a method is provided. The method includes determining a pruning threshold for pruning a first set of pre-trained weights of multiple pre-trained weights based on a function of a classification loss and a regularization loss. The method also includes pruning weights, from the first set of pre-trained weights, with a first value that is less than the pruning threshold. Additionally, the method includes adjusting a second set of pre-trained weights of the multiple pre-trained weights in response to a second value of each pre-trained weight in the second set of pre-trained weights being greater than the pruning threshold.

In another aspect of the present disclosure, an apparatus is provided. The apparatus includes a memory and one or more processors coupled to the memory. The processor(s) are configured to determine a pruning threshold for pruning a first set of pre-trained weights of multiple pre-trained weights based on a function of a classification loss and a regularization loss. The processor(s) are also configured to prune weights, from the first set of pre-trained weights, with a first value that is less than the pruning threshold. In addition, the processor(s) are configured to adjust a second set of pre-trained weights of the multiple pre-trained weights in response to a second value of each pre-trained weight in the second set of pre-trained weights being greater than the pruning threshold.

In another aspect of the present disclosure, an apparatus is provided. The apparatus includes means for determining a pruning threshold for pruning a first set of pre-trained weights of multiple pre-trained weights based on a function of a classification loss and a regularization loss. The apparatus also includes means for pruning weights, from the first set of pre-trained weights, with a first value that is less than the pruning threshold. Additionally, the apparatus includes means for adjusting a second set of pre-trained weights of the multiple pre-trained weights in response to a second value of each pre-trained weight in the second set of pre-trained weights being greater than the pruning threshold.

In a further aspect of the present disclosure, a non-transitory computer readable medium is provided. The computer readable medium has encoded thereon program code. The program code is executed by a processor and includes code to determine a pruning threshold for pruning a first set of pre-trained weights of multiple pre-trained weights based on a function of a classification loss and a regularization loss. The program code also includes code to prune weights, from the first set of pre-trained weights, with a first value that is less than the pruning threshold. Furthermore, the program code includes code to adjust a second set of pre-trained weights of the multiple pre-trained weights in response to a second value of each pre-trained weight in the second set of pre-trained weights being greater than the pruning threshold.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described in the current disclosure as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Convolutional neural networks may use a large amount of computational (e.g., processor) and storage (e.g., memory) resources. As such, it may be difficult to deploy conventional neural networks on systems with limited resources, such as cloud systems, embedded systems, and federated learning systems. Some conventional neural networks are pruned and quantized to reduce an amount of computational and storage resources consumed by the neural network.

Unfortunately, conventional neural networks do not learn pruning criteria during training phase impacting network performance and efficiency. Determining the pruning criteria, such as a pruning threshold, during training may increase neural network processing speed and accuracy in comparison to a neural network in which pruning parameters are learned after training. Additionally, determining the pruning criteria during training may also result in reduced power consumption.

Additionally, in some cases, conventional pruning methods push a value of redundant weights to zero based on a regularization method. In these cases, the neural network may prune zero-value weights to reduce an impact on the performance of the neural network. Some neural networks use batch-normalization (BN) units. The regularization methods for pushing the value of redundant weights to zero may not reduce a performance impact for newer architectures that use batch-normalization units.

Aspects of the present disclosure are directed to improving pruning by learning pruning parameters during training. In one configuration, parameters are pruned based on a learned threshold pruning (LTP) method. LTP is an example of an unstructured pruning method. That is, weights within layers (e.g., convolutional (Cony) layers or fully connected (FC) layers) may be individually pruned. Unstructured pruning is different from structured pruning. In structured pruning, pruning may be limited to kernel level pruning (e.g., collection of many weights). That is, individual layers may not be pruned in structured pruning.

In one configuration, during training, the LTP method learns a threshold for each layer of the neural network. The learned threshold may be referred to as a layer threshold. At the end of training, at each layer, weights that are less than a respective layer threshold are pruned. In this configuration, a differentiable classification loss may be determined based on the learned layer threshold. That is, the differentiable classification loss may be a derivative of the learned layer threshold. Additionally, differentiable $L_0$ regularization loss may be determined based on the learned layer thresholds. That is, the differentiable $L_0$ regularization loss may be a derivative of the layer thresholds. The differentiable $L_0$ regularization loss may be used in the presence of batch-normalization units.

Figure 1:
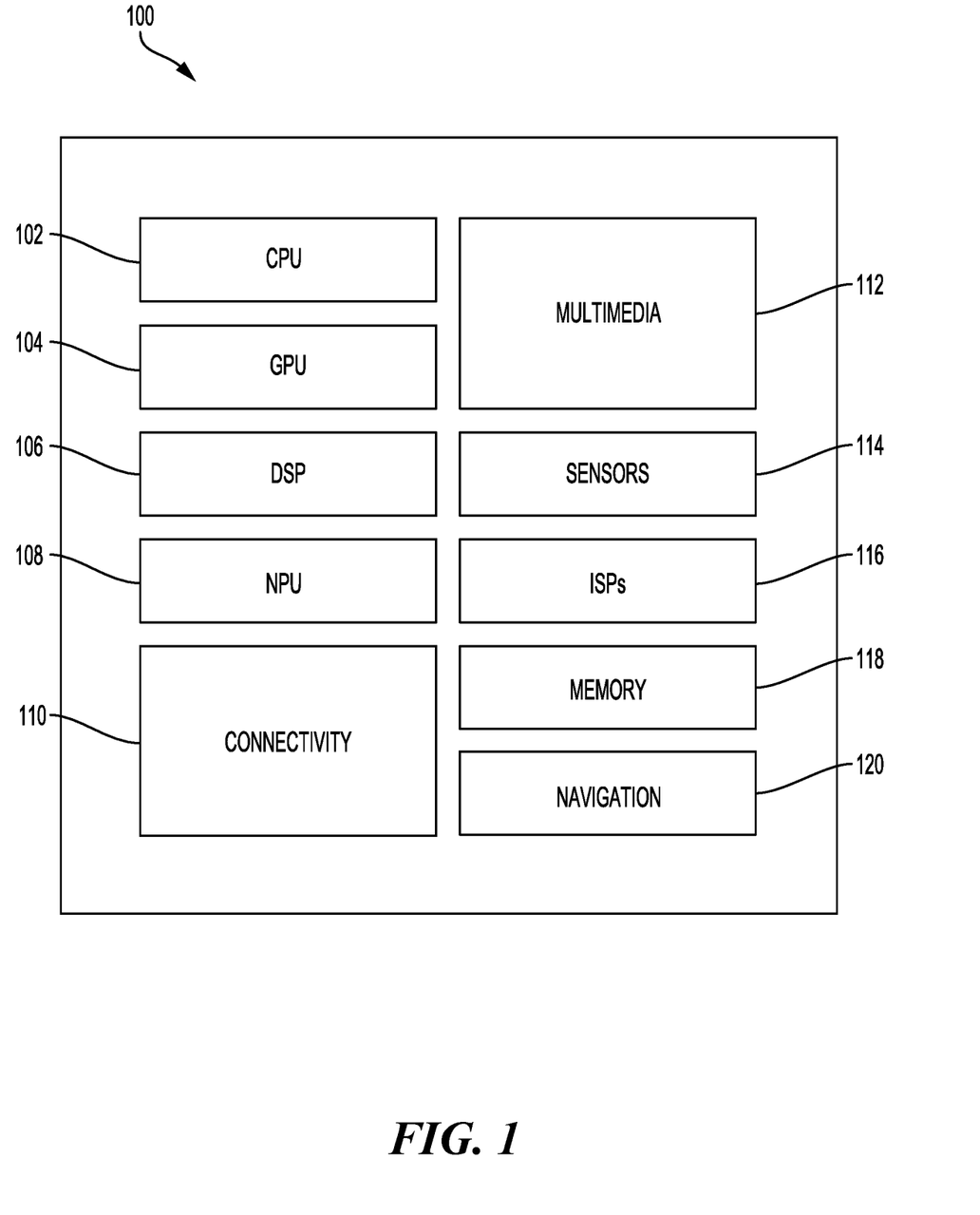
FIG. 1 illustrates an example implementation of designing a neural network using a system-on-a-chip (SOC), including a general-purpose processor in accordance with certain aspects of the present disclosure.

FIG. 1 illustrates an example implementation of a system-on-a-chip (SOC) 100, which may include a central processing unit (CPU) 102 or a multi-core CPU configured for learned threshold pruning, in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the processor 102 may comprise code for determining a pruning threshold for pruning a first set of pre-trained weights of multiple pre-trained weights based on a function of a classification loss and a regularization loss. The instructions loaded into the processor 102 may also comprise code for pruning weights, from the first set of pre-trained weights, with a first value that is less than the pruning threshold. Furthermore, the instructions loaded into the processor 102 may comprise code for adjusting a second set of pre-trained weights of the multiple pre-trained weights in response to a second value of each pre-trained weight in the second set of pre-trained weights being greater than the pruning threshold.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still, higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
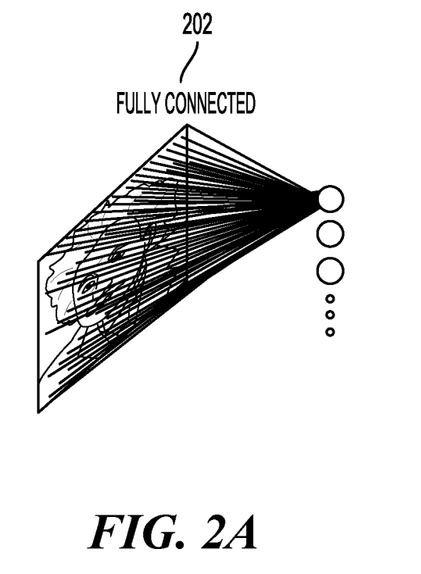
FIGS. 2A, 2B, and 2C are diagrams illustrating a neural network in accordance with aspects of the present disclosure.
Figure 2B:
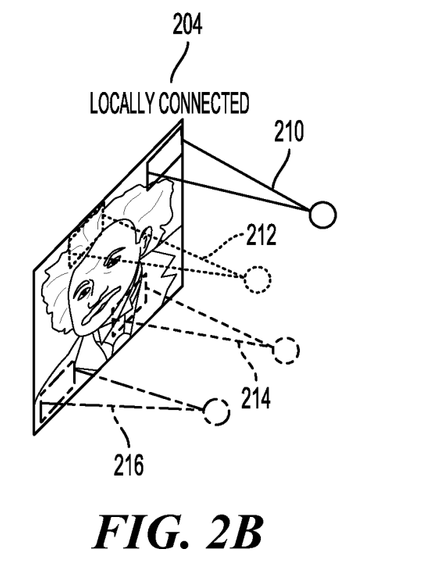

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
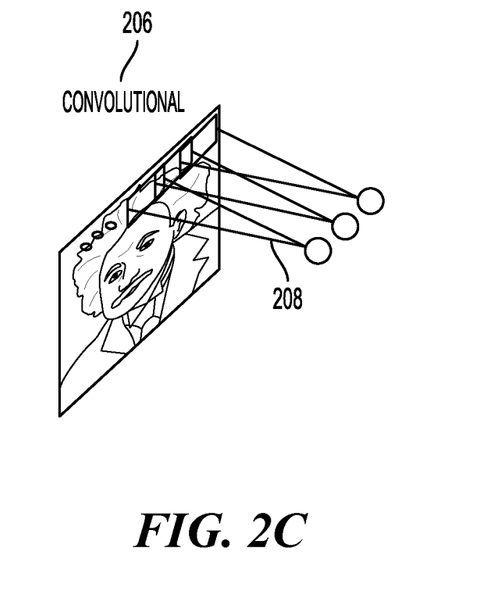

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
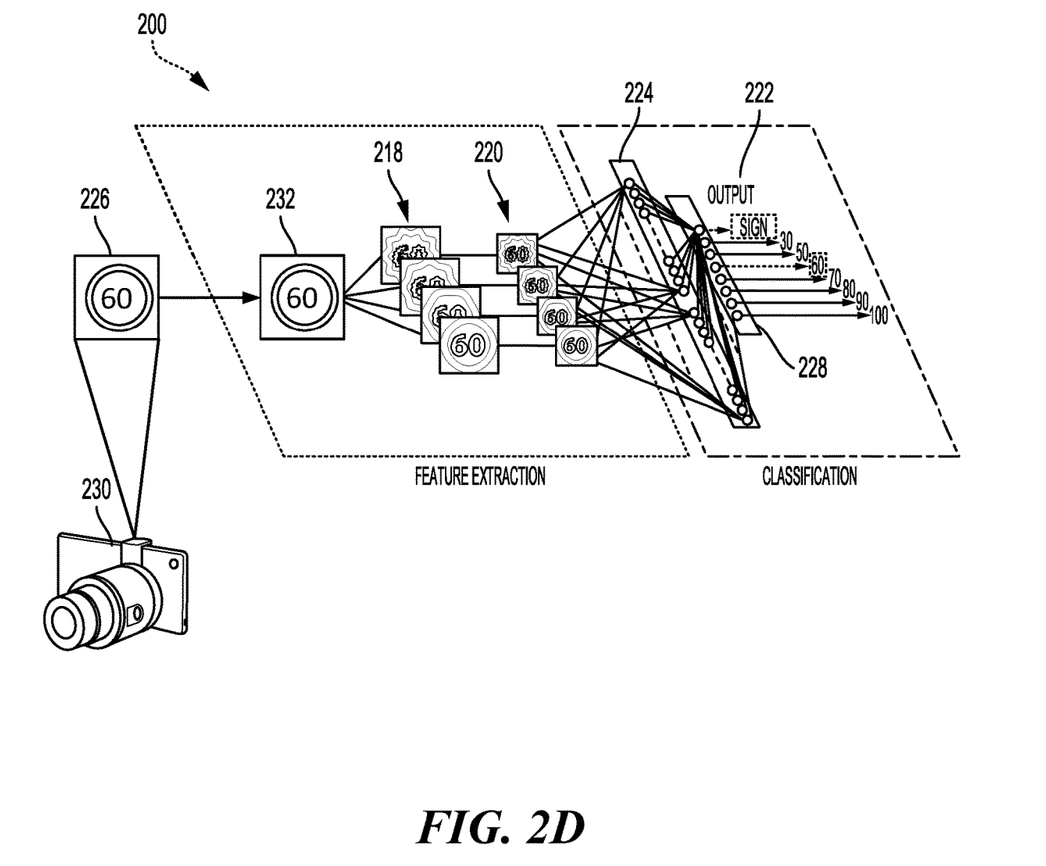
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back-propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
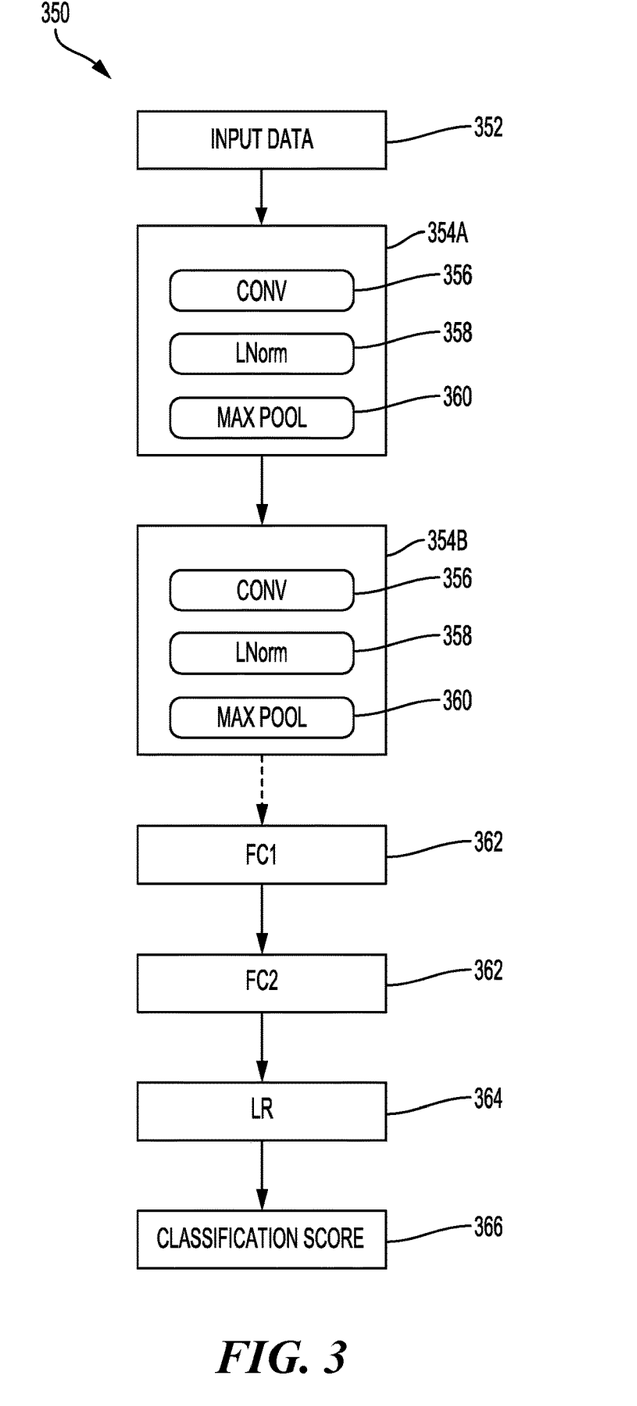
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

As described above, aspects of the present disclosure are directed to improving pruning by learning pruning parameters during training. In one configuration, parameters are pruned based on a learned threshold pruning (LTP) method. LTP is an example of an unstructured pruning method. That is, weights within layers (e.g., convolutional (Cony) layers or fully connected (FC) layers) may be individually pruned. In contrast to unstructured pruning, structured pruning may be limited to kernel level pruning (e.g., collection of many weights). That is, individual layers may not be pruned in structured pruning.

In one configuration, during training, the LTP method learns a threshold for each layer of the neural network. The learned threshold may be referred to as a layer threshold. At the end of training, at each layer, weights that are less than a respective layer threshold are pruned. In this configuration, a differentiable classification loss L may be determined based on the learned layer threshold. The differentiable classification loss L may be a derivative of the learned layer threshold. Additionally, a differentiable $L_0$ regularization loss may be determined based on the learned layer threshold. The differentiable $L_0$ regularization loss may be a derivative of the layer thresholds. The differentiable $L_0$ regularization loss may be used in the presence of batch-normalization units.

In one configuration, the layer thresholds are learned based on a total loss $L_{TOTAL}$ determined as a sum of the differentiable classification loss L and the differentiable $L_0$ regularization loss. In this configuration, weights $w_{kl}$ (e.g., un-pruned weights), where the parameter l represents the l-th layer, may be determined from an initial training phase. The threshold $\tau_l$ for each layer l may be determined during a training phase after the initial training phase. The training phase after the initial training phase may be referred to as a fine-tuning phase (may also be referred to as an adjusting phase). In one configuration, the weights $w_{kl}$ are adjusted during the fine-tuning phase.

According to aspects of the present disclosure, the LTP method determines a layer threshold $\tau_l$ based on a differentiable classification loss L. During training (e.g., the fine-tuning phase), soft-pruned weights $v_{kl}$ may be used in place of original $w_{kl}$ weights. The soft-pruned weights $v_{kl}$ may be determined as follows:

$$v_{kl} = w_{kl} \times sigm\left(\frac{w_{kl}^2 - \tau_l}{T}\right), \quad (1)$$

where sigm( ) represents a sigmoid function and T represents a temperature. The temperature parameter T controls the steepness of the sigmoid function, and regulates the trade-off between the speed of the optimization and the smoothness of the loss landscape. By increasing the temperature, the difficult in optimizing is increased. On the other hand, if the temperature T is reduced, the resulting sparsity will also be reduced. The original weight $w_{kl}$ (e.g., un-pruned weight) may be determined from an initial training phase. Based on equation 1, the sigmoid function outputs zero if a value of an input to the sigmoid function $$\left(e.g., \frac{w_{kl}^2 - \tau_l}{T}\right)$$

is less than 0.5 and outputs a one if the value of the input is equal to or greater than 0.5. Based on equation 1, if a value of the original weight $w_{kl}$ is larger than a value of the threshold $t_l$, a value of the soft-pruned weight $v_{kl}$ may be similar (e.g., equal) to the value of the uncompressed weight $w_{kl}$ (e.g., $v_{kl}=w_{kl}\times1$, where 1 represents the output of the sigmoid function and $w_{kl}$ represents an un-pruned weight). Alternatively, if the value of the uncompressed weight $w_{kl}$ is smaller than the value of the threshold $\tau_l$, the value of the soft-pruned weight $v_{kl}$ may be zero (e.g., $v_{kl}=w_{kl}\times0$, where 0 represents the output of the sigmoid function and $w_{kl}$ represents an un-pruned weight).

The sigmoid function sigm( ) may be differentiable. Therefore, the threshold $\tau_l$ and the weights $w_{kl}$ may be adjusted via back-propagation based on the soft-pruned weight $v_{kl}$ and the sigmoid function. In one configuration, a derivative of the classification loss L with respect to the threshold $t_l$ may be determined as:

$$\frac{\partial L}{\partial \tau_l} = \Sigma_k \frac{\partial L}{\partial v_{kl}} \times \frac{\partial v_{kl}}{\partial \tau_l}, \quad (2)$$

$$\frac{\partial v_{kl}}{\partial \tau_l} = -\frac{w_{kl}}{T} \times sigm\left(\frac{w_{kl}^2 - \tau_l}{T}\right) \times \left(1 - sigm\left(\frac{w_{kl}^2 - \tau_l}{T}\right)\right).$$

Additionally, the derivative of the classification loss L with respect to the weight $w_{kl}$ may be determined as:

$$\frac{\partial L}{\partial w_{kl}} = \frac{\partial L}{\partial v_{kl}} \times \frac{\partial v_{kl}}{\partial w_{kl}}, \frac{\partial v_{kl}}{\partial w_{kl}} \times sigm\left(\frac{w_{kl}^2 - t_l}{T}\right). \quad (3)$$

The classification loss L of equations 2 and 3 is a function of the derivative of the loss with respect to the soft-pruned weights $v_{kl}$. Therefore, the derivative of the classification loss L with respect to the weight $w_{kl}$ (equation 3) may be simultaneously determined with the derivative of the classification loss L with respect to the threshold $t_l$ (equation 2). The classification loss L may be a cross-entropy loss, or another type of differentiable classification loss L. In addition to minimizing the classification loss L, aspects of the present disclosure also minimize a regularization loss $L_0$. In one configuration, the regularization loss $L_0$ is determined as $$L_{0,l} \stackrel{\Delta}{=} \Sigma_k\ sigm\left(\frac{w_{kl}^2 - \tau_l}{T}\right). \quad (4)$$

In equation 4, the regularization loss $L_0$ is a count of the un-pruned weights (e.g., non-zero weights). As described, the sigmoid function outputs zero if a value of an input to the sigmoid function $$\left(e.g., \frac{w_{kl}^2 - \tau_l}{T}\right)$$

is less than 0.5 and outputs a one if the value of the input is equal to or greater than 0.5. That is, the sigmoid function outputs one when the weight $w_{kl}$ is larger than the threshold. An output of one represents an un-pruned weight. Therefore, the regularization loss $L_0$ may be a sum of the un-pruned weights. The regularization loss $L_0$ may also be differentiable.

According to aspects of the present disclosure, the regularization loss $L_0$ promotes pruning. In contrast, the classification loss L penalizes pruning. That is, the classification loss L may be reduced by reducing a number of pruned weights. Thus, in the absence of the regularization loss $L_0$, a value of the threshold $\tau_l$ may be reduced to zero based on equations 2 and 3. Therefore, according to aspects of the present disclosure, the regularization loss $L_0$ is considered in conjunction with the classification loss L to balance classification performance and a number of pruned weights.

The derivative of the regularization loss $L_0$ with respect to the weight $w_{kl}$ may be derived as:

$$\frac{\partial L_{0,l}}{\partial w_{kl}} = \frac{2w_{kl}}{T} \times sigm\left(\frac{w_{kl}^2 - \tau_l}{T}\right) \times \left(1 - sigm\left(\frac{w_{kl}^2 - \tau_l}{T}\right)\right) \quad (5)$$

Additionally, the derivative of the regularization loss $L_0$ with respect to the threshold $t_l$ may be derived as:

$$\frac{\partial L_{0,l}}{\partial \tau_l} = -\frac{1}{T}\Sigma_k sigm\left(\frac{w_{kl}^2 - \tau_l}{T}\right) \times \left(1 - sigm\left(\frac{w_{kl}^2 - \tau_l}{T}\right)\right). \quad (6)$$

The overall loss $L_{TOTAL}$ may be a sum of the classification loss L and a normalized per layer regularization loss $\Sigma_l \alpha_l L_{0,l}$. The overall loss may be derived as follows:

$$L_{TOTAL} = L + \Sigma_l \alpha_l L_{0,l} \quad (7)$$

The pruning preference value $\alpha_l$ may be set on a per-layer basis. As an example, if the pruning preference value $\alpha_l$ is set to one for each layer, each layer l may be treated equally. In another example, it may be desirable to reduce a number of operations rather than a total number of weights. In this example, layers with a larger feature map size (e.g., initial layers) may be given a pruning preference over layers with a smaller feature map size (e.g., output layers). That is, in this example, a value of the pruning preference value $\alpha_l$ for initial layers may be less than a value of the pruning preference value $\alpha_l$ for output layers. The summation of the pruning preference value $\alpha_l$ may provide a final network end-to-end pruning ratio at equilibrium. An amount of pruning may increase as a sum of the pruning preference value $\alpha_l$ increases. The pruning preference value $\alpha_l$ may be set by a user based on the desired application or a type of device used by the network.

During inference, the sigmoid function may be replaced with a hard-limiter, such that all weights below the corresponding threshold are pruned. Additionally, aspects of the present disclosure are applicable to various types of neural networks and are not limited to deep neural networks and/or neural networks that include batch-norms.

Aspects of the present disclosure are not limited to the sigmoid function and may use other differentiable functions, such as a hyperbolic tangent function. The differentiable functions use a temperature parameter for smoothing the function. The differentiable functions may converge to a hard-limiter or step function through annealing the temperature parameter while training the network to determine the threshold $\tau_l$ and weights $W_{kl}$.

Aspects of the present disclosure are not limited to unstructured pruning for pruning individual weights. Other types of pruning, such as group-pruning or structured pruning, are contemplated. Group-pruning may be directed to pruning a group of weights defined by an application or hardware platform. As another example, for structured pruning, kernel norms may be pruned based on a comparison with the learned threshold $\tau_l$.

Figure 4:
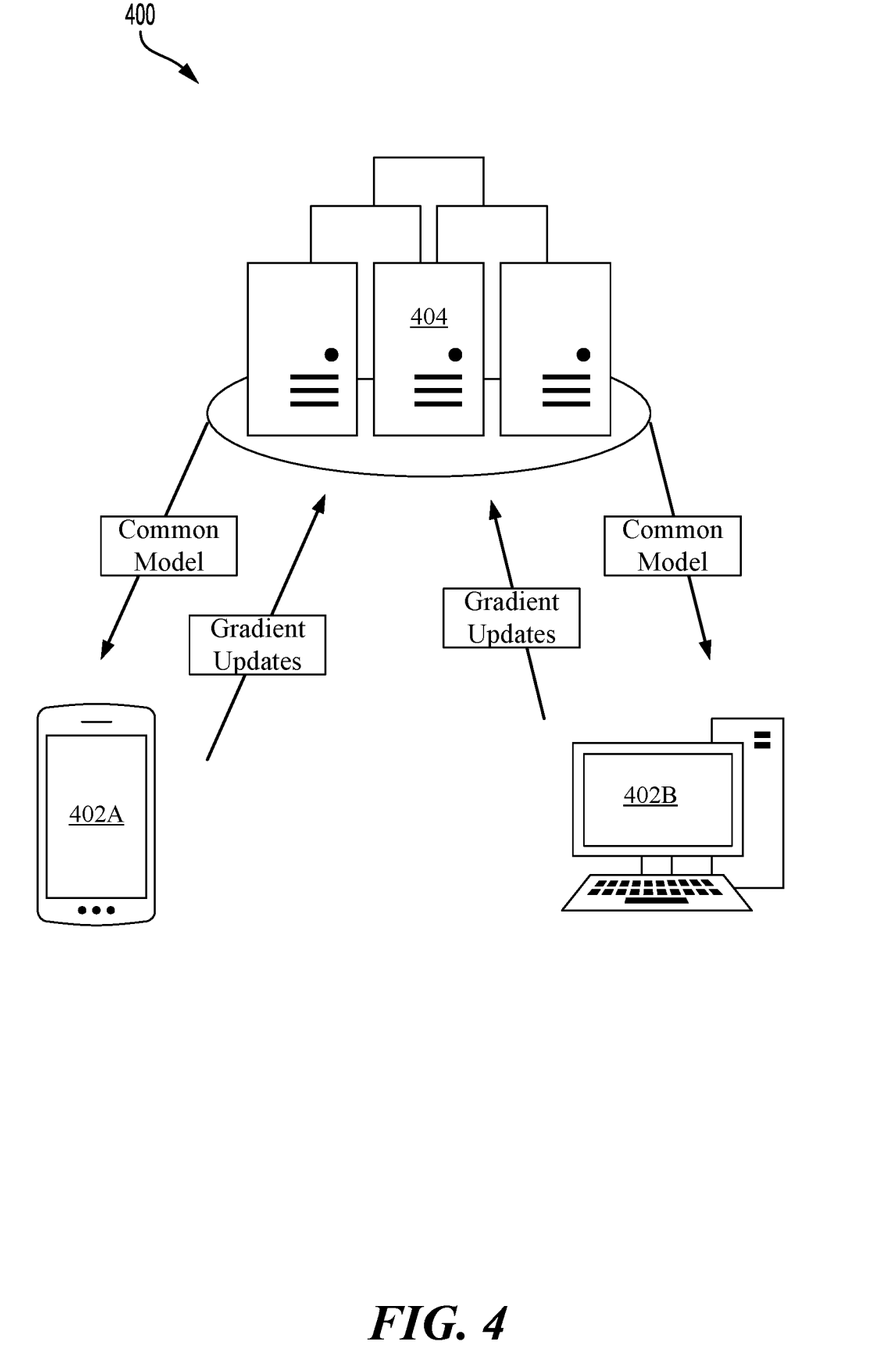
FIG. 4 is a diagram illustrating an example of a federated learning system, in accordance with aspects of the current disclosure.

Aspects of the present disclosure may be implemented in federated learning systems. FIG. 4 is a diagram illustrating an example of a federated learning system 400, in accordance with aspects of the current disclosure. In the example of FIG. 4, in the federated learning system 400, each user device 402a, 402b may locally train a common model. That is, the common model may be trained on the user device 402a, 402b based on user provided training data. The common model may be provided by a server 404.

Computational resources of the user devices 402a, 402b may be limited. In some cases, a computational burden for inference and back-propagation may be proportional to the number of model weights. The computational burden may be defined in terms of flops and memory footprint. Aspects of the present disclosure are not limited to the types of user devices 402a, 402b (e.g., mobile device and desktop computer) shown in FIG. 4. Other types of devices are contemplated. Additionally, aspects of the present disclosure are not limited to a federated learning system 400 with two devices 402a, 402b. Additional devices are contemplated.

In the current example, for the federated learning system 400, each user device 402a, 402b may report gradient updates to the server 404. The gradient updates may be reported via a communication channel. Additionally, noise may be added to each gradient update to preserve privacy of the training data. The communication resources specified for transmitting the gradient updates to the server 404 may be proportional to the number of model weights Aspects of the present disclosure may be implemented in the federated learning system 400 to reduce model weights. The reduction in a number of model weights may reduce a number of reported gradient updates, reduce a number of weights specified for training a common model at a user device, and/or improve privacy. As an example, reducing the number of weights may increase a difficulty of reconstructing private data. Thus, in this example, reducing the number of weights may improve privacy.

In one configuration, each user device 402a, 402b downloads a model (e.g., artificial neural network) based on the learned threshold $\tau_l$ (e.g., per-layer threshold $\tau_1$). That is, each user device 402a, 402b may only download weights equal to or greater than the threshold $\tau_l$. Alternatively, the server 404 may only transmit weights equal to or greater than the threshold $\tau_l$. Additionally, or alternatively, the gradient updates may be limited based on the threshold $\tau_l$. As an example, each user device 402a, 402b may only provide gradient updates for weights equal to or greater than the threshold $\tau_l$.

According to aspects of the present disclosure, the pruning preference value $\alpha_l$ may be configured for each user device 402a, 402b. That is, each user device 402a, 402b may communicate with the server 404 to agree on a set of pruning preference values $\alpha_l$ (e.g., one pruning preference value per layer), such that per-layer thresholds are customized to each user device 402a, 402b based on user device 402a, 402b needs and/or server 404 needs. For example, per-layer pruning preference values $\alpha_l$ for a first user device 402a may be different from per-layer pruning preference values $\alpha_l$ for a second user device 402b. Based on the different per-layer pruning preference values $\alpha_l$, a threshold $\tau_l$ for a first layer may be larger for the first user device 402a in comparison to the threshold $\tau_l$ for the second user device 402b. In this example, the threshold $\tau_3$ for a third layer may be smaller for the first user device 402a in comparison to the threshold $\tau_3$ for the second user device 402b. The difference may be based on different user device 402a, 402b specifications. For example, the first user device 402a may have limited memory, while the second user device 402b may have limited flops. Aspects of the present disclosure may dynamically adapt thresholds based on pruning preference values $\alpha_l$ that reflect different user constraints.

Figure 5:
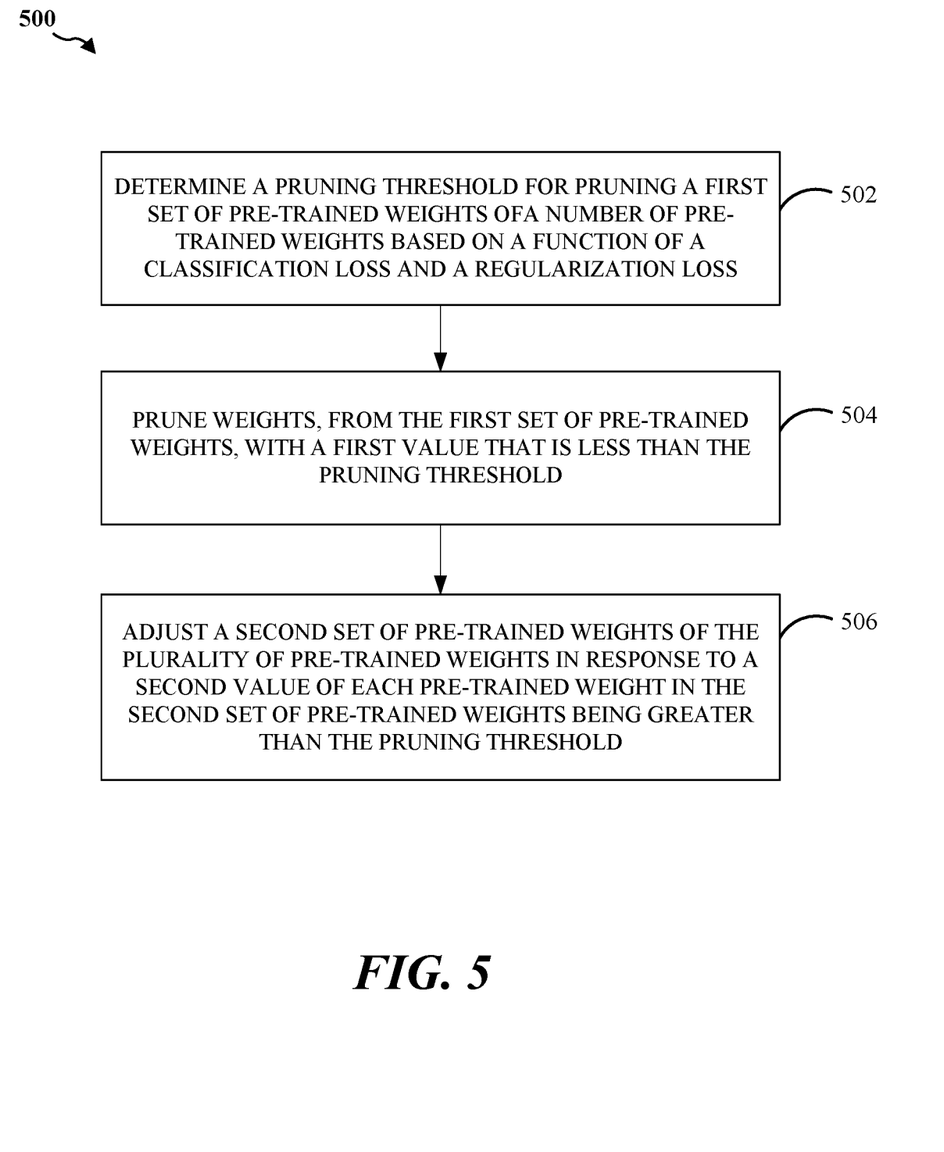
FIG. 5 is a flow diagram for a process for pruning weights of a neural network based on a learned threshold.

FIG. 5 is a flow diagram for a process 500 for pruning weights of a neural network based on a learned threshold. As shown in FIG. 5, at block 502, the process 500 determines a pruning threshold for pruning a first set of pre-trained weights of multiple pre-trained weights based on a function of a classification loss and a regularization loss.

At block 504, the process prunes weights, from the first set of pre-trained weights, with a first value that is less than the pruning threshold.

At block 506, the process adjusts a second set of pre-trained weights of the multiple pre-trained weights in response to a second value of each pre-trained weight in the second set of pre-trained weights being greater than the pruning threshold.

In some aspects, a differentiable pruned weight is determined as a product of a pre-trained weight from the multiple pre-trained weights and a differentiable function. The differentiable function determines a pruning value based on the pre-trained weight, the pruning threshold, and a temperature for smoothing the differentiable function.

In some aspects, the regularization loss is determined based on the pruning value determined for each layer of the artificial neural network. Additionally, in some aspects, the classification loss is reduced, and in some cases, minimized based on a first gradients of the pruning threshold and second gradients of the multiple pre-trained weights. Further, the regularization loss may be normalized based on a pruning preference value, in which determining the pruning threshold includes determining a total loss based on the classification loss and the normalized regularization loss.

In some aspects, the artificial neural network is distributed to a user device of a federated learning system and configures the pruning preference value based on a hardware profile of the user device. The first set of pre-trained weights may be excluded from the distributed artificial neural network.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a web site, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the presented operations. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the described methods and techniques to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method, comprising:
   determining a pruning threshold for pruning a plurality of pre-trained weights of a first artificial neural network (ANN) model based on a function of a classification loss and a regularization loss, the regularization loss comprising a count of unpruned weights;
   pruning a first set of pre-trained weights, of the plurality of pre-trained weights of the first ANN model, with a first value that is less than the pruning threshold;
   adjusting a second set of pre-trained weights of the plurality of pre-trained weights of the first ANN model in response to a second value of each pre-trained weight in the second set of pre-trained weights being greater than the pruning threshold; and
   generating a second ANN model based on the adjusted second set of pretrained weights.

2. The processor-implemented method of claim 1, further comprising determining a differentiable pruned weight as a product of a pre-trained weight from the plurality of pre-trained weights and a differentiable function, the differentiable function determining a pruning value based on the pre-trained weight, the pruning threshold, and a temperature for smoothing the differentiable function.

3. The processor-implemented method of claim 2, further comprising minimizing the classification loss based on a first gradients of the pruning threshold and second gradients of the plurality of pre-trained weights.

4. The processor-implemented method of claim 2, further comprising determining the regularization loss based on the pruning value determined for each layer of the first ANN model.

5. The processor-implemented method of claim 1, further comprising normalizing the regularization loss based on a pruning preference value, in which determining the pruning threshold comprises determining a total loss based on the classification loss and the normalized regularization loss.

6. The processor-implemented method of claim 5, further comprising:
   distributing the second ANN model to a user device of a federated learning system; and
   configuring the pruning preference value based on a hardware profile of the user device.

7. The processor-implemented method of claim 6, further comprising excluding the first set of pre-trained weights from the second ANN model.

8. An apparatus, comprising:
   a memory; and
   at least one processor coupled to the memory, the at least one processor being configured:
   to determine a pruning threshold for pruning a plurality of pre-trained weights of a first artificial neural network (ANN) model based on a function of a classification loss and a regularization loss, the regularization loss comprising a count of unpruned weights;
   to prune a first set of pre-trained weights, of the plurality of pre-trained weights of the first ANN model, with a first value that is less than the pruning threshold;
   to adjust a second set of pre-trained weights of the plurality of pre-trained weights of the first ANN model in response to a second value of each pre-trained weight in the second set of pre-trained weights being greater than the pruning threshold; and
   generating a second ANN model based on the adjusted second set of pretrained weights.

9. The apparatus of claim 8, in which the at least one processor is further configured to determine a differentiable pruned weight as a product of a pre-trained weight from the plurality of pre-trained weights and a differentiable function, the differentiable function determining a pruning value based on the pre-trained weight, the pruning threshold, and a temperature for smoothing the differentiable function.

10. The apparatus of claim 9, in which the at least one processor is further configured to minimize the classification loss based on a first gradients of the pruning threshold and second gradients of the plurality of pre-trained weights.

11. The apparatus of claim 9, in which the at least one processor is further configured to determine the regularization loss based on the pruning value determined for each layer of the first ANN model.

12. The apparatus of claim 8, in which the at least one processor is further configured to normalize the regularization loss based on a pruning preference value, in which determining the pruning threshold comprises determining a total loss based on the classification loss and the normalized regularization loss.

13. The apparatus of claim 12, in which the at least one processor is further configured:
   to distribute the second ANN model to a user device of a federated learning system; and
   to configure the pruning preference value based on a hardware profile of the user device.

14. The apparatus of claim 13, in which the at least one processor is further configured to exclude the first set of pre-trained weights from the second ANN model.

15. An apparatus including at least one processor and a memory, comprising:
   means for determining a pruning threshold for pruning a plurality of pre-trained weights of a first artificial neural network (ANN) model based on a function of a classification loss and a regularization loss, the regularization loss comprising a count of unpruned weights;
   means for pruning a first set of pre-trained weights, of the plurality of pre-trained weights of the first ANN model, with a first value that is less than the pruning threshold;
   means for adjusting a second set of pre-trained weights of the plurality of pre-trained weights of the first ANN model in response to a second value of each pre-trained weight in the second set of pre-trained weights being greater than the pruning threshold; and
   generating a second ANN model based on the adjusted second set of pretrained weights.

16. The apparatus of claim 15, further comprising means for determining a differentiable pruned weight as a product of a pre-trained weight from the plurality of pre-trained weights and a differentiable function, the differentiable function determining a pruning value based on the pre-trained weight, the pruning threshold, and a temperature for smoothing the differentiable function.

17. The apparatus of claim 16, further comprising means for minimizing the classification loss based on a first gradients of the pruning threshold and second gradients of the plurality of pre-trained weights.

18. The apparatus of claim 16, further comprising means for determining the regularization loss based on the pruning value determined for each layer of the first ANN model.

19. The apparatus of claim 15, further comprising means for normalizing the regularization loss based on a pruning preference value, in which determining the pruning threshold comprises determining a total loss based on the classification loss and the normalized regularization loss.

20. The apparatus of claim 19, further comprising:
    means for distributing the second ANN model to a user device of a federated learning system; and
    means for configuring the pruning preference value based on a hardware profile of the user device.

21. The apparatus of claim 20, further comprising means for excluding the first set of pre-trained weights from the second ANN model.

22. A non-transitory computer readable medium having encoded thereon, program code, the program code being executed by a processor and comprising:
    program code to determine a pruning threshold for pruning a plurality of pre-trained weights of a first artificial neural network (ANN) model based on a function of a classification loss and a regularization loss, the regularization loss comprising a count of unpruned weights;
    program code to prune a first set of pre-trained weights, of the plurality of pre-trained weights of the first ANN model, with a first value that is less than the pruning threshold;
    program code to adjust a second set of pre-trained weights of the plurality of pre-trained weights of the first ANN model in response to a second value of each pre-trained weight in the second set of pre-trained weights being greater than the pruning threshold; and
    generating a second ANN model based on the adjusted second set of pretrained weights.

23. The non-transitory computer readable medium of claim 22, further comprising program code to determine a differentiable pruned weight as a product of a pre-trained weight from the plurality of pre-trained weights and a differentiable function, the differentiable function determining a pruning value based on the pre-trained weight, the pruning threshold, and a temperature for smoothing the differentiable function.

24. The non-transitory computer readable medium of claim 23, further comprising program code to minimize the classification loss based on a first gradients of the pruning threshold and second gradients of the plurality of pre-trained weights.

25. The non-transitory computer readable medium of claim 23, further comprising program code to determine the regularization loss based on the pruning value determined for each layer of the first ANN model.

26. The non-transitory computer readable medium of claim 22, further comprising program code to normalize the regularization loss based on a pruning preference value, in which determining the pruning threshold comprises determining a total loss based on the classification loss and the normalized regularization loss.

27. The non-transitory computer readable medium of claim 26, further comprising program code:
    to distribute the second ANN model to a user device of a federated learning system; and
    to configure the pruning preference value based on hardware profile of the user device.

28. The non-transitory computer readable medium of claim 27, further comprising program code to exclude the first set of pre-trained weights from the second ANN model.

* * * * *